May 19, 1953 W. W. PAGET 2,638,923
PILOT CONTROLLED REVERSING VALVE MECHANISM
Filed June 25, 1948 3 Sheets-Sheet 1
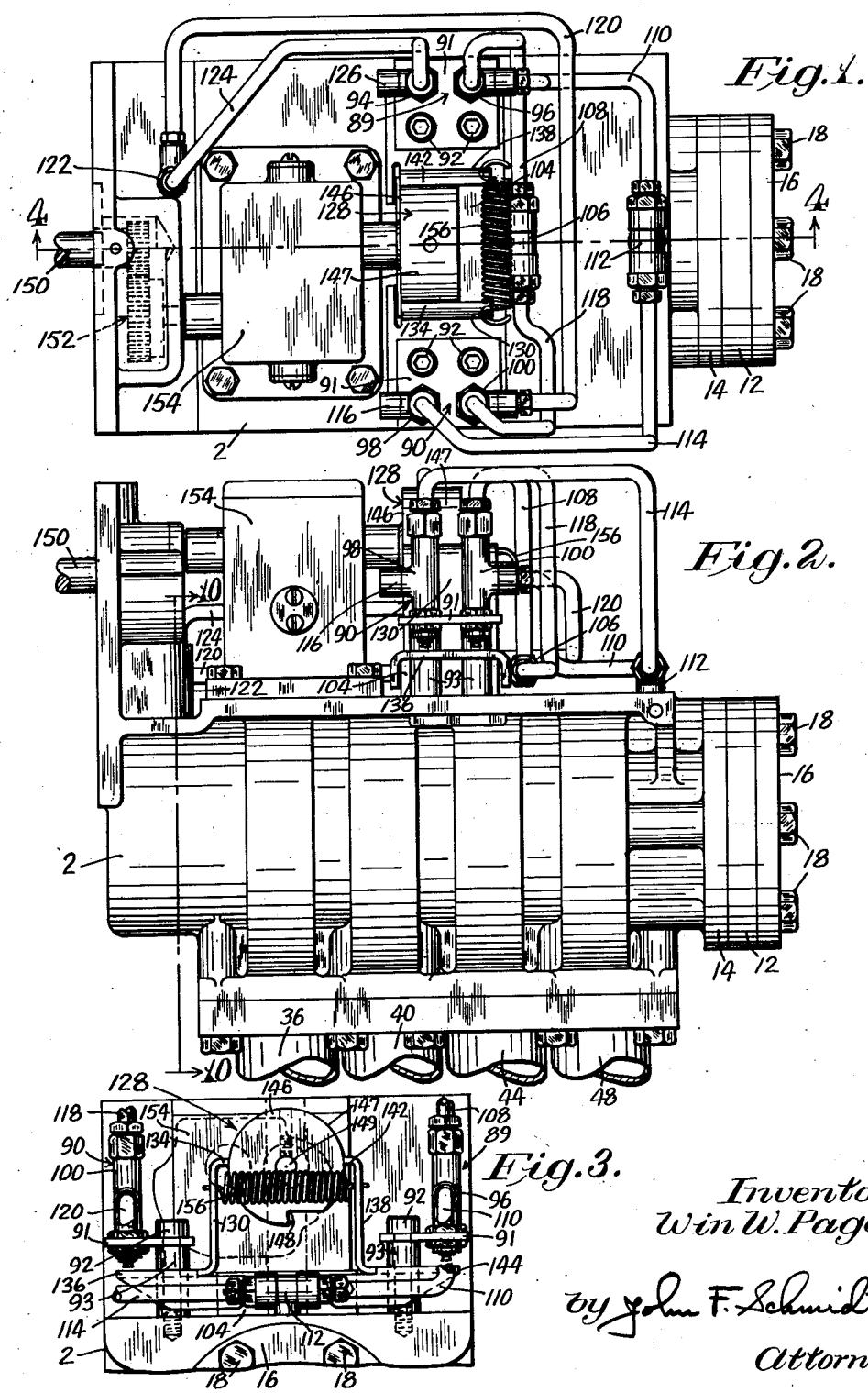
Inventor:
Win W. Paget
by John F. Schmidt
Attorney

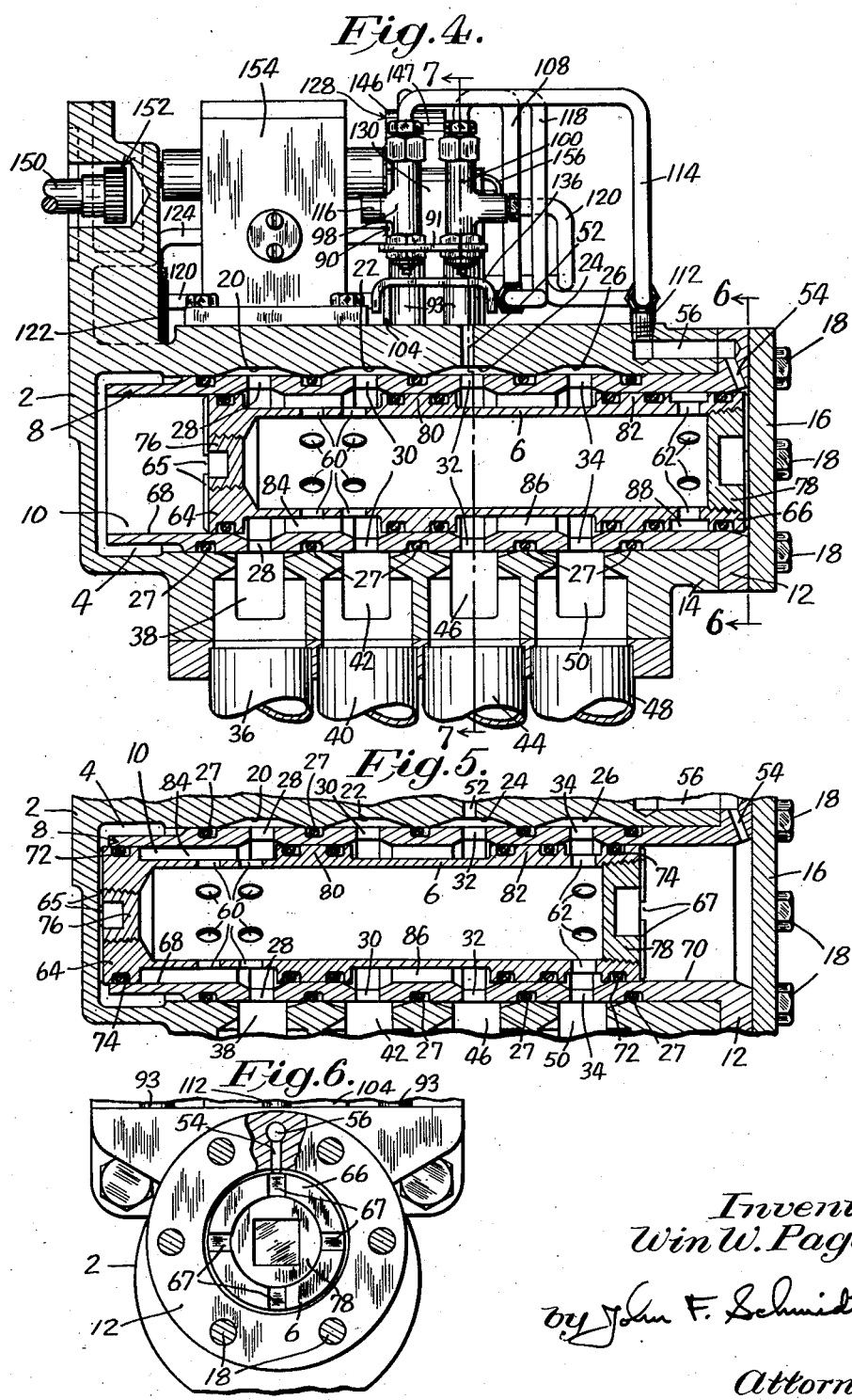

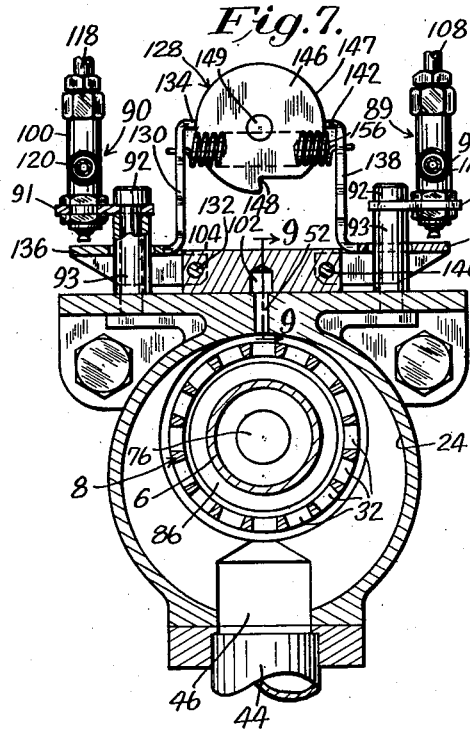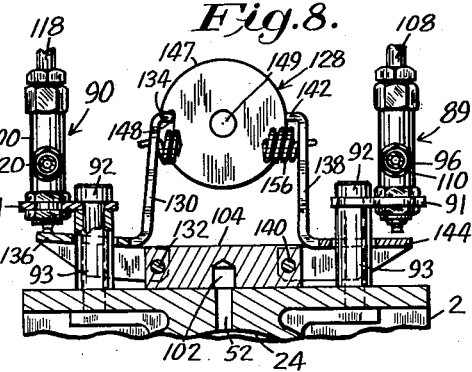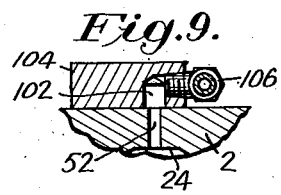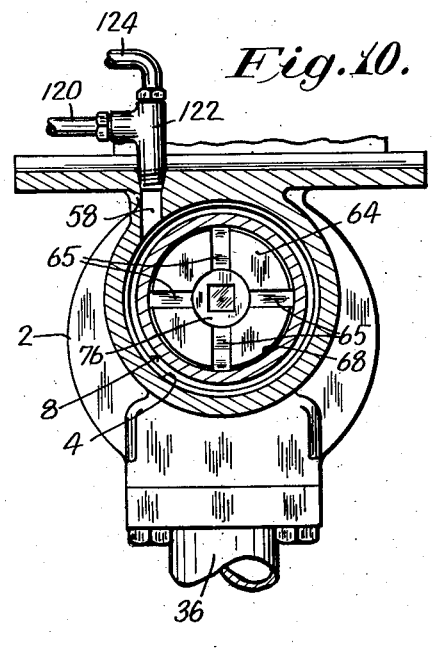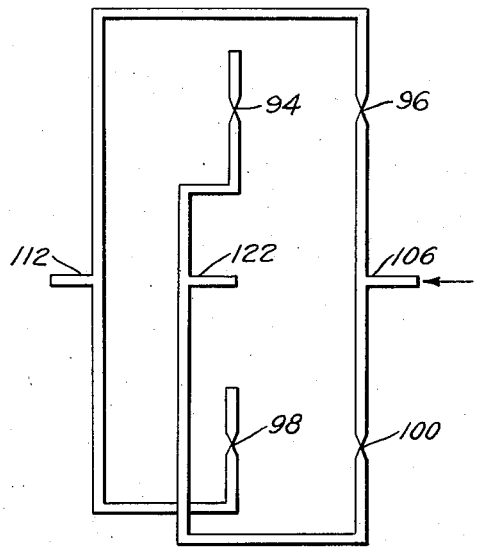

Patented May 19, 1953

2,638,923

UNITED STATES PATENT OFFICE 2,638,923

PILOT CONTROLLED REVERSING VALVE MECHANISM

Win W. Paget, Michigan City, Ind., assignor to Joy Manufacturing Company, Pittsburgh, Pa., a corporation of Pennsylvania Application June 25, 1948, Serial No. 35,092

4 Claims. (Cl. 137—622)

This invention relates to automatic reversing valves, especially to valves for the periodic switching of fluid flow between two alternative conduits.

The valve of this invention has particular application to oxygen production apparatus of the type shown in patent applications Serial Nos. 30,388 and 31,018, filed June 1, 1948 and June 4, 1948, but it will be understood that it can be used in other industrial applications requiring valves having similar characteristics.

In oxygen generators of the type disclosed and claimed in the above-identified applications, water and carbon dioxide are removed from the entering air stream by condensation and/or freezing on the walls of the first two heat exchangers because of cooling of the conduit by contact with the outgoing waste gas (largely nitrogen) and outgoing oxygen product.

The water and carbon dioxide thus collected on the inner walls of the entering conduit have to be removed periodically to keep the conduit from becoming plugged. To accomplish this purpose, the conduits in the first two heat exchangers for entering air and leaving effluent (waste gas) are periodically switched or interchanged, enabling the leaving effluent to carry off the water and carbon dioxide by entrainment and/or sublimation.

It is highly desirable that the switch between conduits be made with a suddenness approximating an explosion, in order that a great quantity of the accumulated water and carbon dioxide may be jarred loose from the conduit walls, to be then carried out by the leaving effluent.

It is accordingly an object of this invention to provide an automatic valve which allows a pair of conduits carrying different fluids to be interchanged, in order that impurities deposited out of the incoming fluid may be periodically removed by the outgoing fluid to prevent clogging of the conduit for the incoming fluid. It is another object of the invention to provide a valve in which the aforesaid interchange is accomplished so suddenly as to subject the system to a physical shock such that impurities will be dislodged from the conduit walls and will thereafter be carried out by the leaving fluid.

In the drawings:

Fig. 1 is a top plan view of a valve mechanism made according to the invention.

Fig. 2 is a side elevation view of the mechanism.

Fig. 3 is an end elevation view of a portion of the mechanism showing details of the cam and rocker arms.

Fig. 4 is a view in section on the plane of line 4—4 of Fig. 1.

Fig. 5 shows a portion of the valve, on the same section plane as Fig. 4 but showing the movable internal member in another operating position.

Fig. 6 is a view in section substantially on the plane of line 6—6 of Fig. 4, with a portion of the mechanism broken away and in section for a better disclosure of one of the fluid passages.

Fig. 7 is a view in section on the plane of line 7—7 of Fig. 4.

Fig. 8 is a detailed view of a portion of the mechanism similar to Fig. 7 but showing the cam and one of the cam followers in a different operating position.

Fig. 9 is a view in section on the plane of line 9—9 of Fig. 7.

Fig. 10 is a view in section on the plane of line 10—10 of Fig. 2; and

Fig. 11 is a circuit diagram which shows schematically the pneumatic circuit including the external connections, the valves and the conduits.

A casing 2 is provided with a substantially cylindrical cavity 4 and is provided with a plurality of fluid passages as will be discussed in detail below. A substantially cylindrical internal member 6 is reciprocable in the internal cavity into a plurality of operating positions. The walls of the cylindrical cavity of the casing may, if desired, provide the surface on which internal member 6 slides as it reciprocates into its different operating positions, but in the preferred form of the invention, a removable sleeve 8 is fitted in the cavity 4 and is itself provided with a substantially cylindrical cavity 10, the walls of which provide the surface on which internal member 6 reciprocates. Sleeve 8 is provided with a flange 12 which is clamped between the open end 14 of body 2 and a cover 16, the cover 16 being secured in place by threaded members 18.

The cylindrical cavity 4 has a plurality of annular grooves or recesses 20, 22, 24 and 26. Fluid seals for the annular grooves are provided by means of O-ring packing 27 disposed in grooves provided in the external surface of the sleeve, in such a manner that each groove 20, 22, 24, 26 lies between two O-ring packings. The annular groove or recess 20 cooperates with a plurality of radial passages 28 in sleeve 8 to form fluid passages to the interior of the sleeve. Annular groove 22 cooperates with a plurality of radial passages 30 in sleeve 8 to form still other fluid passages to the interior of the sleeve. Annular groove 24 cooperates with radial passages 32 in the sleeve to form additional fluid passages, and annular groove 26 cooperates with radial passages 34 in the sleeve to form still other fluid passages.

A fluid conduit 36 is in communication with annular groove 20 by way of a passage 38 in the casing; a fluid conduit 40 is in communication with annular groove 22 through the passage 42; a conduit 44 is in communication with annular groove 24 through passage 46; and a conduit 48 communicates with annular groove 26 through passage 50.

One of the fluid conduits is constantly connected to a source of fluid under substantial pressure. In the application of the invention referred to in the above identified patent applications, conduit 44 is constantly connected to a source of compressed air at a pressure of approximately 160 p. s. i. gauge. A passage 52 in the casing is in constant communication with the compressed air supply by way of the annular groove 24.

A fluid passage 54 in sleeve 8 connects the right end of the cylindrical cavity 10 of the sleeve with a fluid passage 56 in the valve casing. A fluid passage 58 (Fig. 10) in the casing communicates with the left end of the cylindrical cavity 10 of the sleeve. As is best seen in Fig. 4, no passage through the left end of sleeve 8 is necessary because there is a clearance between the left end of sleeve 8 and the extreme left end of the cavity 4.

In the preferred form of the invention, internal member 6 is a substantially cylindrical piece having a plurality of fluid passages therethrough. The fluid passages are provided by making the member hollow, somewhat in the form of a shell, and providing two sets of radial passages 60 and 62 in the shell.

A piston 64, slotted as shown at 65, is formed at the left end of the member 6, and another piston 66, slotted as shown at 67, is formed at the right end thereof, as viewed in Figs. 4 and 5. Pistons 64 and 66 cooperate with the internal cylindrical surfaces of sleeve 8 to form a pair of oppositely acting pressure sensitive members. We may consider for the purposes of discussion that the piston 64 operates in a cylinder 68, and that the piston 66 operates in a cylinder 70. Pistons 64 and 66 may be provided with fluid seals, such as the O-ring packing 72 shown lying in grooves 74. The open end of piston 64 is closed by a plug 76, and the open end of piston 66 is closed by a plug 78. Both plugs are screwed in so as to have their outer faces flush with the bottoms of slots 65 and 67 respectively, in order to present a greater area to the actuating fluid when the piston is against the casing end wall.

Between its ends, internal member 6 may be provided with plug portions 80 and 82. These plug portions are of substantially the same diameter as pistons 64 and 66, and are provided with fluid seals similar to those of the pistons. Between piston 64 and plug portion 80, there is an annular passage 84; between the two plug portions 80 and 82 there is an annular passage 86; and between the plug portion 82 and piston 66 there is an annular passage 88. The purpose of these annular passages will be more completely set forth below.

Valve means consisting of two pairs of valves, indicated generally at 89 and 90, are provided with suitable conduits to conduct air under pressure to the opposite cylinders 68 and 70 to move the internal member 6 into its plurality of operating positions. The valves may be secured by any suitable means to casing 2, as for example by means of plates 91, threaded members 92, and sleeves or bushings 93. See especially Fig. 7. Thus the upper portion of casing 2 provides a base for the support of the pilot valve mechanism consisting of the valves, their connecting conduits, the external connections, and the valve operating mechanism.

Referring now to the valve means in greater detail, the means 89 preferably comprises two valves 94 and 96, and the means 90 comprises two valves 98 and 100. Valves 94, 96, 98 and 100 are substantially identical and consist simply of a passage closed by a reciprocable plug member; the plug member is preferably biased toward its closed position by any suitable means, as for example by a spring. The details of these valves form no part of this invention. It will be understood by those skilled in the art that suitable valves for the purpose required here are obtainable from several different sources.

Passage 52 in the casing 2 was referred to above as being in constant communication with the source of compressed air. As is best seen in Fig. 7, passage 52 communicates with a passage 102 in a block 104. A T-shaped external connection 106 (Fig. 9) is in communication with the passage 102. A conduit 108 connects one arm of the T with the top of valve 96. A conduit 110 connects valve 96 with one arm of another external connection T 112, of which the leg is in direct communication with passage 56 (Fig. 4). The opposite arm of T 112 is connected to a conduit 114 which connects with the top of valve 98. Valve 98 communicates with the atmosphere through the short conduit 116.

A conduit 118 connects the other arm of T 106 with the top of valve 100. A conduit 120 connects valve 100 with an external connection 122 (Fig. 10). The connection 122 is in direct communication with passage 58. A conduit 124 is in fluid communication with connection 122 and goes at its other end to the top of valve 94. A short conduit 126 communicates valve 94 with the atmosphere.

The plungers of the valves 94, 96, 98 and 100 are arranged to be reciprocated into valve-open position by a camming mechanism, indicated generally at 128. This mechanism consists, in the preferred form, of: a rocker arm 130 pivoted at 132, having a cam follower 134 and valve actuating leg 136; a rocker arm 138 pivoted at 140, having a cam follower 142 and valve actuating leg 144; and a cam 146 having a cam surface 147, notched as shown at 148, and mounted for rotation on a shaft 149 by any suitable power supplied to input shaft 150 and delivered through reduction gears 152 and a gear reduction unit enclosed in the box 154. A spring 156 has its opposite ends secured to the rocker arms 130 and 138 to bias the cam followers 134 and 142 into close engagement with the cam surface 147.

It will thus be understood by one skilled in the art that the pilot valve of this invention provides a control device comprising a source of fluid under pressure, which in this case may be considered the conduit 44; first conduit means connecting that source to the valve mechanism which is to be controlled, the first conduit means constituting here the two conduits 108 and 110, as well as those portions of the casing of valve 96 which serve as conduit means; second conduit means connecting the source with the valve mechanism to be controlled, the second conduit means consisting in the embodiment shown of the conduits 118 and 120 along with those portions of the casing of valve 100 which also serve as conduit means; first and second stop valves 96 and 100 in the first and second conduit means respectively; third conduit means connecting the mechanism with the atmosphere consisting of conduits 124 and 126 and those portions of the casing of valve 94 which serve as conduit means; fourth conduit means connecting the valve mechanism to atmosphere consisting in the illustrated embodiment of the conduits 114 and 116, as well as those portions of the casing of valve 98 which serve as conduit means; third and fourth stop valves 94 and 98 in the third and fourth conduit means respectively; and actuating mechanism to open the normally closed valves consisting of the rocker arms 130 and 138 and the cam 128.

*Operation*

In the specified application of this invention to the oxygen generating equipment as disclosed in the above identified applications, it is desired that the incoming air and outgoing effluent interchange conduits on the order of every three minutes. To that end, cam 146 is rotated by means of the reduction gears 152 and the gear reduction unit in the box 154 to make one revolution in approximately six minutes. When the notch 148 has rotated into a position opposite cam follower 134, the cam follower drops into the notch, as shown in Fig. 8, because the two cam followers are biased toward the shaft 149 by the spring 156. When the cam follower 134 drops into the notch, rocker arm 130 pivots about its pin 132 and the valve actuating leg 136 moves the plungers of valves 98 and 100 into valve-open position.

When valve 100 opens, compressed air flows from conduit 44, which is always connected to the compressed air supply, through the passage 46, annular groove or recess 24, passages 52 and 102, T-connection 106, conduit 118, valve 100, conduit 120, connection 122, and passage 58 to the left end of cavity 4 and cavity 10, whereby compressed air is admitted to cylinder 68 and acts on piston 64 to move the internal member 6 to the right into the operating position shown in Fig. 4.

In this position, compressed air flows from conduit 44, through passage 46, radial passages 32, annular passage 86 between the two plug portions 80 and 82, through radial passages 34, passage 50, and to the first heat exchanger by way of conduit 48. Waste gas or effluent from the first heat exchanger flows through conduit 40 into passage 42, through radial passages 30, annular passage 84, radial passages 28, passage 38 and into conduit 36 which is always connected with the exhaust. It will be noted that the radial passages 60 and 62 in the internal member serve no purpose for this particular phase of the function, inasmuch as radial passages 62 open into a closed chamber of very small volume.

Simultaneously with the opening of valve 100, valve 98 is opened. With valve 98 open, the right hand cylinder 70 is vented to atmosphere by way of passages 54 and 56, T-connection 112, conduit 114, valve 98, and conduit 116, thus permitting the internal member 6 to move to the right without interference by compression of the air in cylinder 70.

As cam 146 continues to rotate clockwise, as seen in Figs. 3, 7 and 8, the first notable event is the closing of valves 98 and 100. After an interval of say three minutes, the notch 148 appears opposite the cam follower 142, whereupon rocker arm 138 pivots in response to spring tension and opens valves 94 and 96. When valve 96 opens, fluid under pressure flows from conduit 44 through passage 46, annular groove 24, passages 52 and 102, T-connection 106, conduit 108, valve 96, conduit 110, T-connection 112, passages 56 and 54 to the right hand cylinder 70. The internal member 6 is thereupon moved sharply to the left into the operating position shown in Fig. 5.

There is no resistance to the leftward movement of member 6 by the air in the left hand cylinder 68, because valve 94 opened at the same time that valve 96 opened, venting cylinder 68 to atmosphere by way of passage 58, connection 122, conduit 124, valve 94, and conduit 126.

With the internal member 6 in the operating position shown in Fig. 5, air flows to the first heat exchanger from conduit 44 through passage 46, radial passages 32, annular passage 86, radial passages 30, passage 42, and conduit 40. Thus, whereas previously conduit 40 was connected to receive waste gas, it is now connected to the compressed air line. Waste gas or effluent, in the operating position shown in Fig. 5, now returns from the first heat exchanger by way of conduit 48, passage 50, radial passages 34 and 62, the inside of member 6, radial passages 60 and 28, passage 38, and conduit 36 to the exhaust.

One of the advantages of a reversing mechanism of the type shown here is the fact that it operates to give a sudden or sharp action, equivalent to an explosion and sufficient to impart a physical shock to the apparatus such as will suffice to jar solid impurities loose from the walls of the heat exchanger or exchangers in the system. Other advantages lie in the simplicity of construction and in the fact that the internal member 6 is not subjected radially to any unbalanced pressures. Other advantages will be apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

What is claimed is:

1. A pilot valve device comprising a base, a first fluid passage provided in the base, an external connection to said first passage, a source of fluid under pressure connected to said first passage, a second fluid passage provided in the base, an external connection to said second passage, first conduit means connected with said first passage external connection and with said second passage external connection, a third fluid passage provided in the base, an external connection to said third passage, second conduit means connected with said first passage external connection and with said third passage external connection, first and second stop valves in the first and second conduit means respectively and mounted on the base in spaced apart relation, third conduit means connected with said third passage external connection and with the atmosphere, fourth conduit means connected with said second passage external connection and with the atmosphere, third and fourth stop valves in the third and fourth conduit means respectively and mounted on the base in spaced apart relation with respect to each other and adjacent the first and second stop valves respectively, each said valve having yielding means urging it closed and being movable to open position, means to open the first and third valves simultaneously, other means to open the second and fourth valves simultaneously, a cam positioned to actuate the two last-mentioned means, and a source of power connected to operate the cam.

2. A device according to claim 1, in which the valve opening means constitute rocker arms mounted on opposite sides of the cam.

3. A device according to claim 2, in which the cam is a rotatable member having a substantially cylindrical cam surface provided with a recess.

4. A device according to claim 1, in which the cam is a substantially cylindrical member having a recess to allow movement of the cam followers radially inward of the cam toward its axis of rotation.

WIN W. PAGET.

References Cited in the file of this patent

UNITED STATES PATENTS

| Number | Name | Date |
|---|---|---|
| 650,777 | Bromley | May 29, 1900 |
| 721,562 | Hibbard | Feb. 24, 1903 |
| 763,694 | Robinson | June 28, 1904 |
| 1,092,359 | Heinrich | Apr. 7, 1914 |
| 1,552,331 | Millard | Sept. 1, 1925 |
| 1,956,775 | Ross | May 1, 1934 |
| 2,283,398 | Tucker | May 19, 1942 |
| 2,317,065 | Kaelin | Apr. 20, 1943 |
| 2,369,505 | Ward | Feb. 13, 1945 |